United States Patent [19]

Ikegawa et al.

[11] Patent Number: 4,855,992
[45] Date of Patent: Aug. 8, 1989

[54] REVERSIBLE OPTICAL RECORDING MEDIUM WITH AN OPTOTHERMALLY DEFORMABLE RECORDING LAYER

[75] Inventors: Sumio Ikegawa, Tokyo; Akio Hori, Kawasaki; Shuichi Komatsu, Yokohama; Shinji Arai, Chigasaki; Nobuaki Yasuda, Zushi, all of Japan

[73] Assignee: Kabushiki Kaisha Toshiba, Kawasaki, Japan

[21] Appl. No.: 136,972

[22] Filed: Dec. 23, 1987

[30] Foreign Application Priority Data

Feb. 13, 1987 [JP] Japan ................................ 62-30744

[51] Int. Cl.$^4$ ........................... G11B 7/24; G11B 7/26
[52] U.S. Cl. .................................. 369/275; 369/100; 369/284; 369/286; 369/288; 430/945; 430/270; 346/766; 346/135.1
[58] Field of Search ............... 369/275, 284, 286, 288, 369/100; 346/135.1, 76 L, 77 E; 430/945, 270; 365/126; 358/344

[56] References Cited

U.S. PATENT DOCUMENTS

| | | | |
|---|---|---|---|
| 4,300,227 | 11/1981 | Bell | 346/135.1 |
| 4,360,895 | 11/1982 | Cornet | 346/135.1 |
| 4,371,954 | 2/1983 | Cornet | 365/126 |
| 4,404,656 | 9/1983 | Cornet | 365/126 |
| 4,408,213 | 10/1983 | Bell | 346/135.1 |
| 4,473,633 | 9/1984 | Wada et al. | 346/135.1 |
| 4,682,321 | 7/1987 | Takaoka et al. | 346/135.1 |
| 4,702,991 | 10/1987 | Takeoka et al. | 346/135.1 |
| 4,719,615 | 1/1988 | Feyner et al. | 369/275 |

FOREIGN PATENT DOCUMENTS

| | | |
|---|---|---|
| 56-124136 | 9/1981 | Japan . |
| 56-124136 | 9/1981 | Japan . |
| 56-127937 | 10/1981 | Japan . |
| 6069846 | 4/1985 | Japan . |

Primary Examiner—Alan Faber
Assistant Examiner—Hoa T. Nguyen
Attorney, Agent, or Firm—Oblon, Spivak, McClelland, Maier & Neustadt

[57] ABSTRACT

There is disclosed a bubble-mode data-rewritable optical disc, which has a transparent substrate and a recording layer, formed on the substrate, for storing data to be optically rewritable. The substrate is at least partially formed of an organic material, which releases a gas component when it is heated at a radiation region of a data recording light beam. The recording layer is deposited on the substrate by co-sputtering or co-vacuum evaporation. The recording layer is made of a specific amorphous material containing silicon and fine metal particles. When the gas component is released from the substrate, the recording layer is deformed to be locally peeled off out of the substrate by pressure of the gas component, thus forming a protuberance. In a data erasing mode, a data erasing light beam is radiated onto the recording layer, which is then deformed so as to cause the protuberance to disappear, and has a substantially flat surface, thereby erasing the stored information.

18 Claims, 9 Drawing Sheets

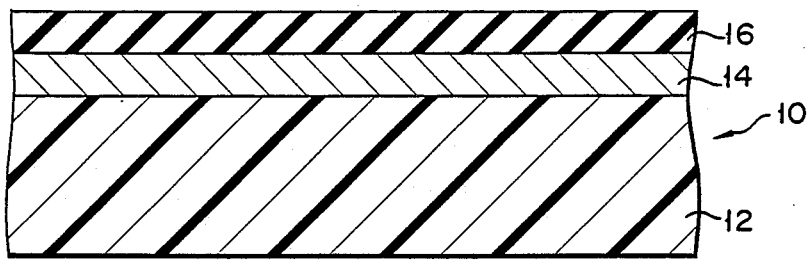
F I G. 1
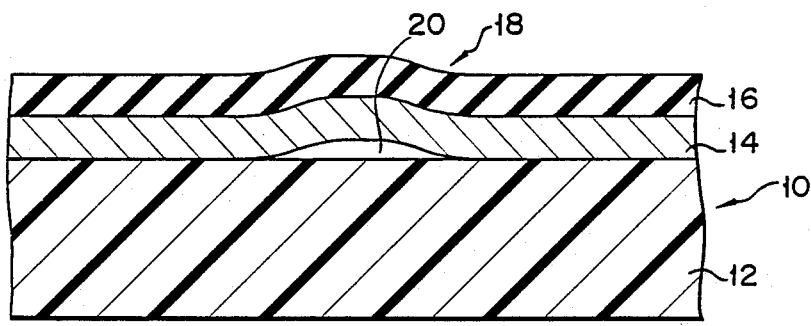
F I G. 2
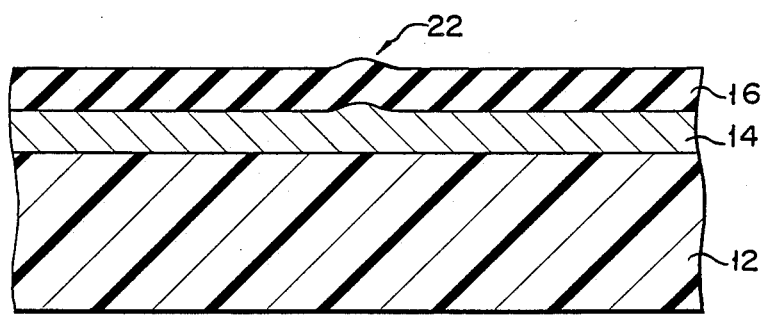
F I G. 3

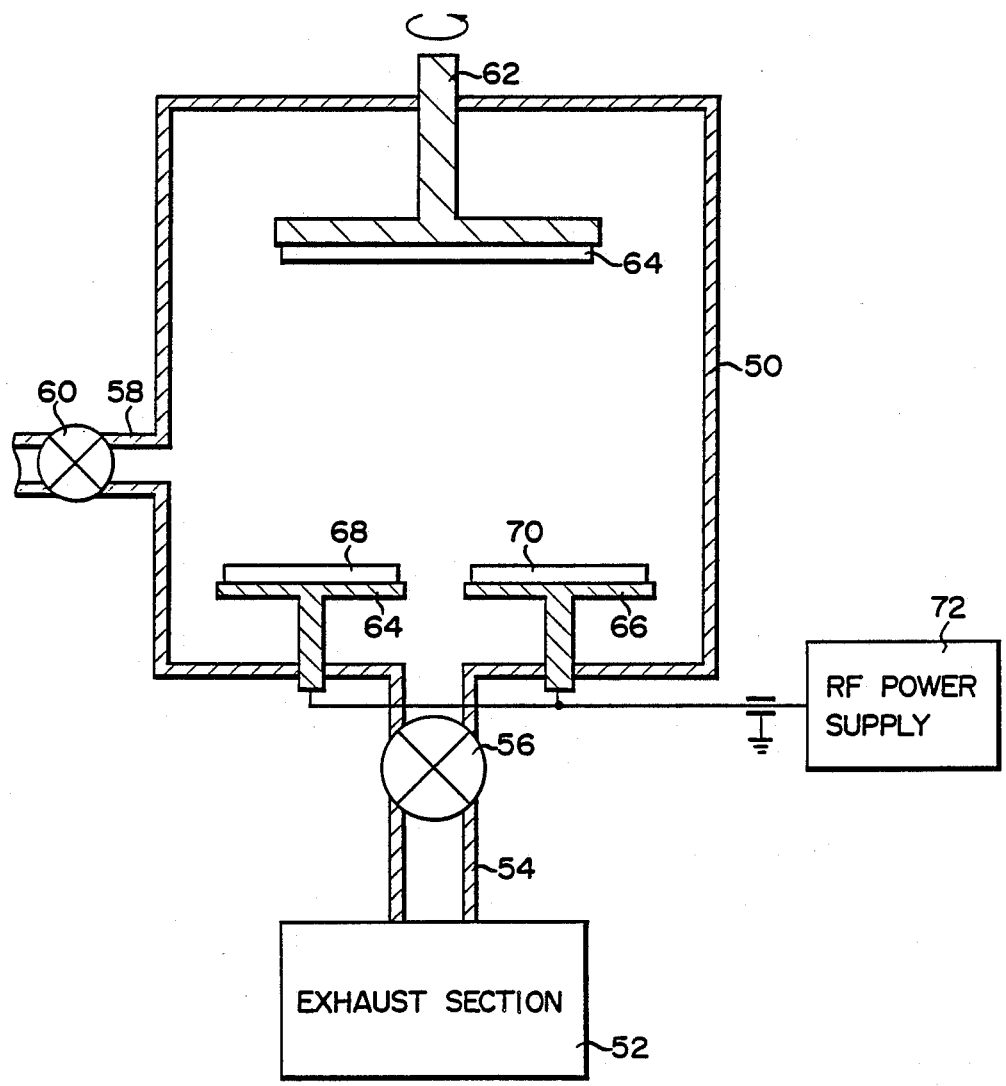
F I G. 6

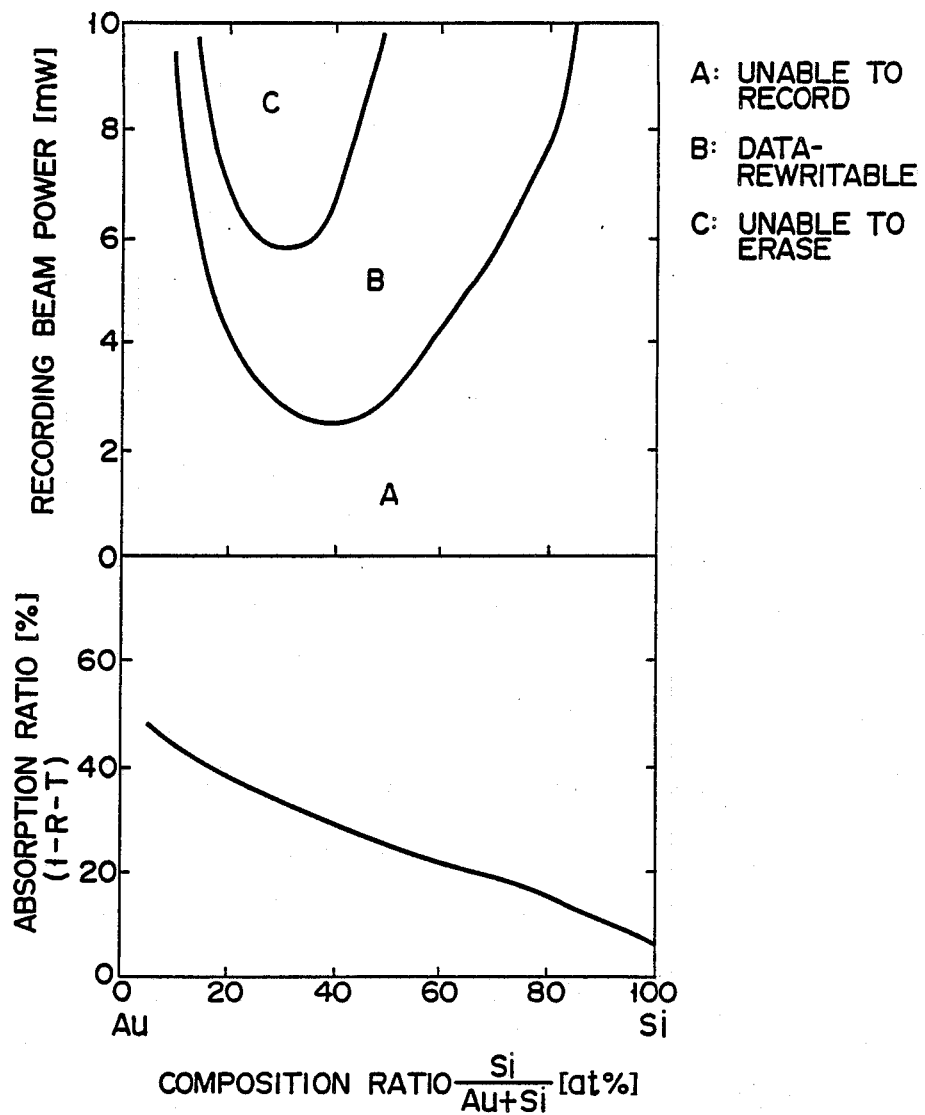
F I G. 7

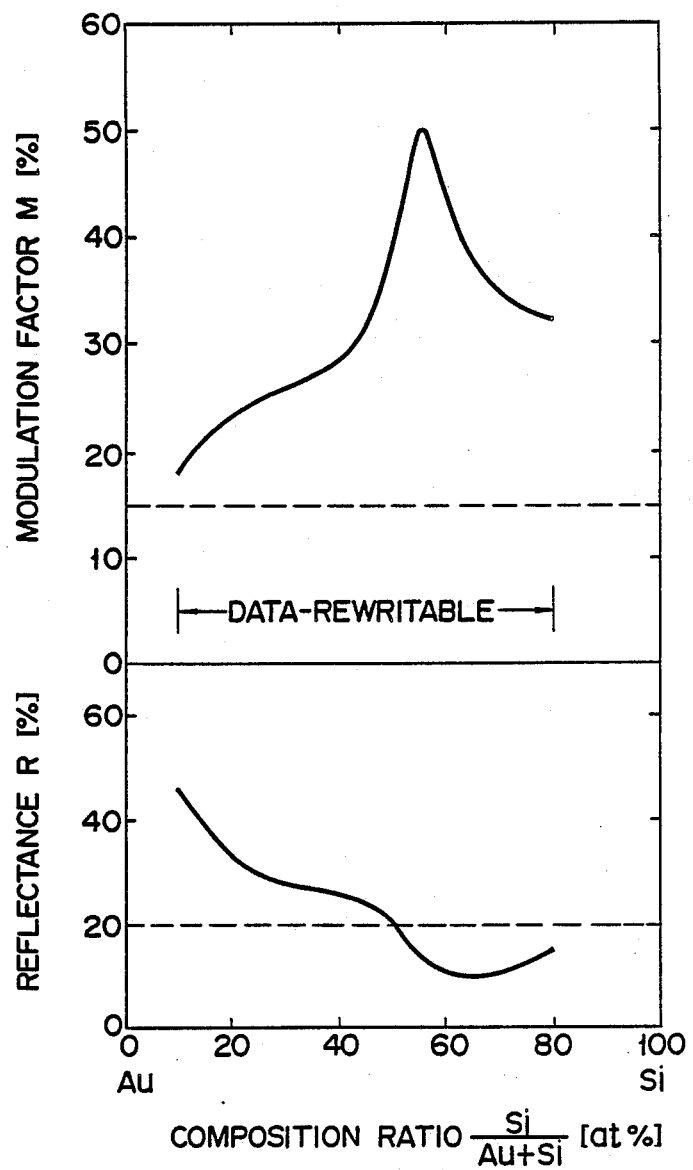
F I G. 8

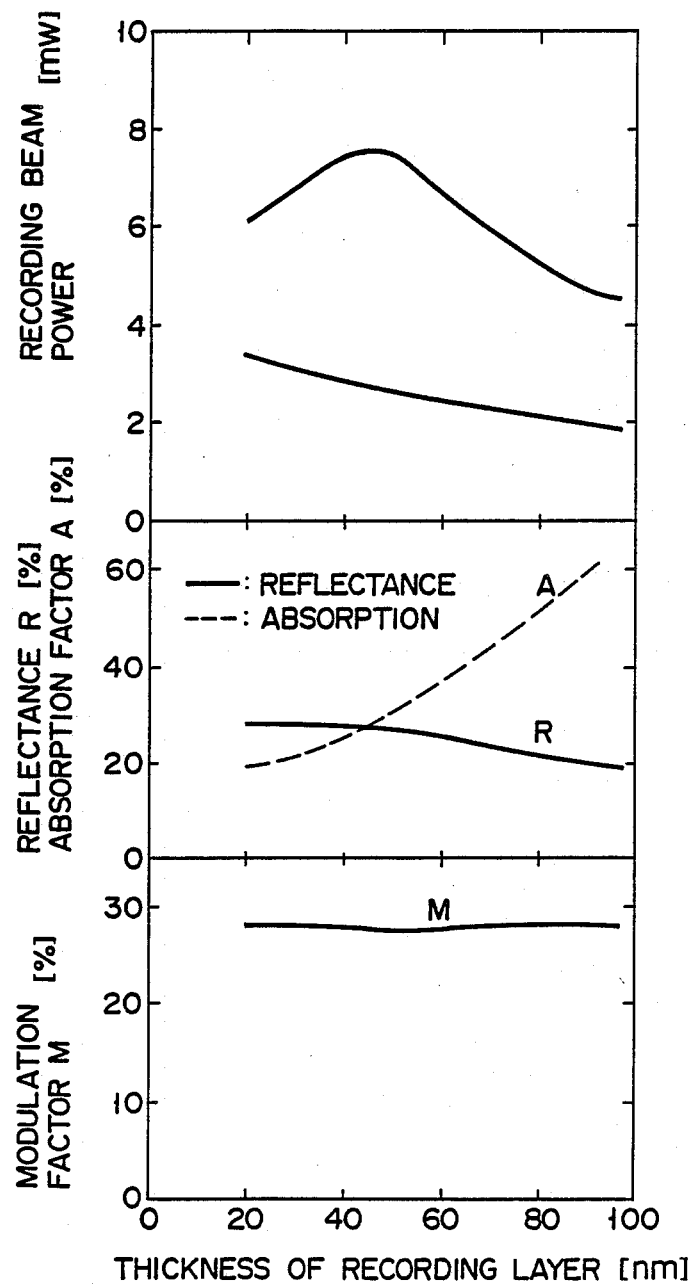
F I G. 10

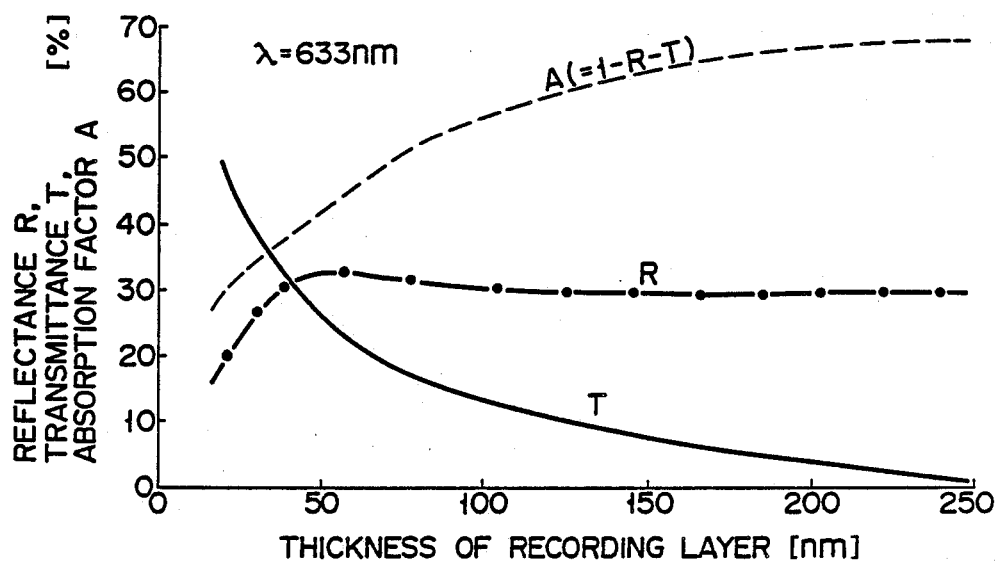
F I G. 11
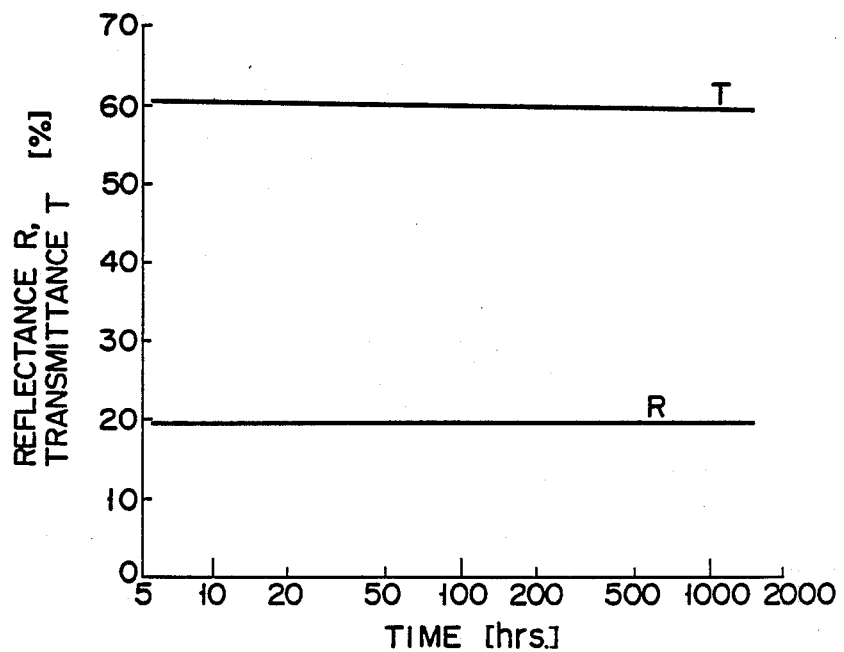
F I G. 12

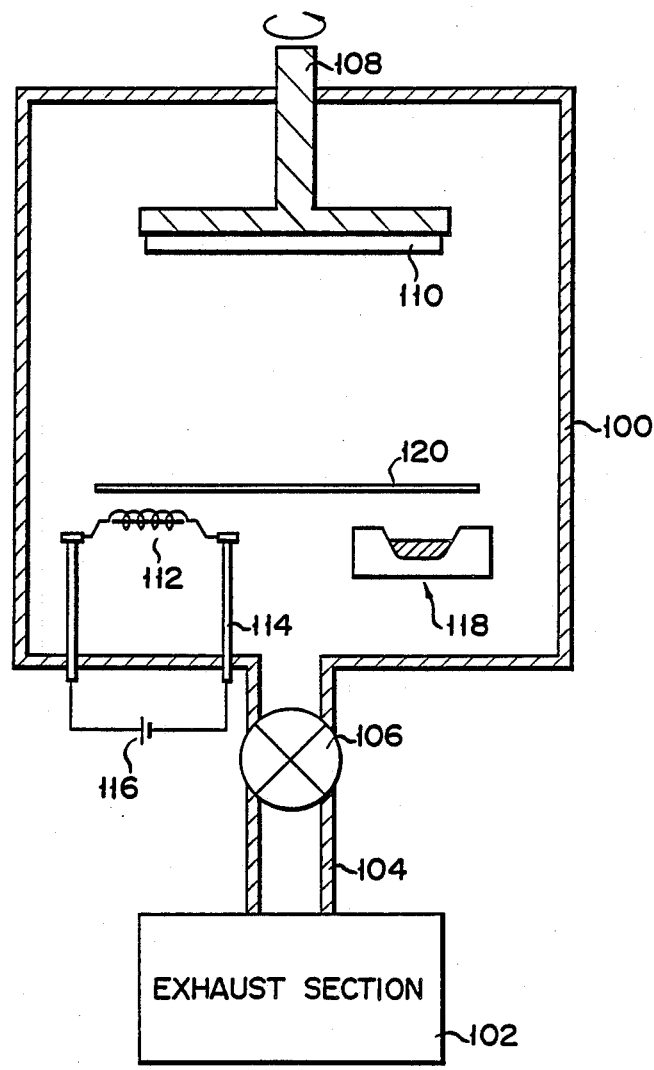
F I G. 13

REVERSIBLE OPTICAL RECORDING MEDIUM WITH AN OPTOTHERMALLY DEFORMABLE RECORDING LAYER

BACKGROUND OF THE INVENTION

The present invention relates to an optical recording medium and, more particularly, to a data rewritable or reversible bubble mode optical recording medium.

In data rewritable optical recording media, such as reversible optical disc memories, optical data is recorded in a recording layer, and the written data is reproduced, as required, using a data-reading light beam, or else the data previously recorded in the recording layer is erased to be replaced with new data, if necessary. Optical discs of this type are employed in numerous applications encompassing a wide variety of technical fields (including a data storage memory in a computer controlled data filing/retrieval system, a knowledge database in an artificial intelligence type "expert" system, a supplementary memory disc of a personal work station, etc.), and are considered to be one of the most promising recording media along with developments of information industries.

Magneto-optical recording media and recording media utilizing a phase transition effect are known as typical reversible optical discs (i.e., data-rewritable optical discs) to those skilled in the art. A magneto-optical recording medium has a recording layer which is made of a rare-earth-transition metal amorphous ferrimagnetic alloy film (to be hereinafter referred to as an "RE-TM film"). When a recording magnetic field is applied to the recording layer and a laser beam is focused thereonto, the perpendicular magnetization in the RE-TM film is inverted in accordance with the light intensity, and bit data is magnetically stored therein. In order to read out stored data information, the RE-TM recording layer is irradiated with a d.c.-polarized reproduction laser beam. The data is then read out by detecting the Kerr rotation of a linearly-polarized laser beam reflected by the recording layer. Since the Kerr rotation is very small, the sensitivity of an optical system in a disc drive unit must therefore be increased. Further, a magnetic field apply means is necessary in addition to the optical system. These requirements result in a recording/reproduction apparatus of complicated arrangement and high cost.

A phase transition type optical recording medium employs, as its recording layer, a thin film (typically, a thin film containing a chalcogen, e.g., tellurium, selenium, and the like) of a specific material which changes its crystallographic phase between crystalline and amorphous states under certain conditions. A change in birefringence of the recording layer caused by data storage is detected as a change in the reflectance of light, thereby reproducing stored data information. Therefore, the detection sensitivity of reproduction data is necessarily low, and a good reproduction contrast cannot be obtained. As a result, in a practical application, accurate data reproduction cannot be expected.

U.S. Pat. No. 4,404,656 (to Cornet) discloses a bubble mode optical recording medium, wherein a recording layer comprises an organic layer and a metal layer (or alloy layer) formed on an intermediate layer. Upon radiation of a data-writing laser beam, the double-layered recording layer is locally deformed to form a protuberance. More specifically, the upper metal layer is plastically deformed by pressure of a gas released from the organic layer upon heating, thereby forming the protuberance. Since, in a recording medium of this type, plastic deformation of the recording layer is permanent, the data storing protuberance once formed cannot be flattened. In other words, the recording medium disclosed in this patent is not a data-rewritable type.

U.S. Pat. No. 4,371,954 (to Cornet) discloses another bubble mode optical recording medium, wherein a recording layer comprises two layers which have different thermal expansion coefficients and are adhered to each other, e.g., a first layer (a polymer or metal layer) which releases a gas and is deformed thereby upon heating, and a second layer (a shape memory alloy layer) which exhibits a martensitic phase at an ambient temperature. The double-layered recording layer is deformed upon local heating to form a protuberance, thereby storing bit data therein. When the stored data is to be erased, a light beam having a different wavelength is radiated to cancel the protuberance deformation of the shape memory alloy layer. However, with presently existing manufacturing technology, it is very difficult to effect a mass production process wherein the shape memory alloy layer is deposited with its thickness reduced to 100 nanometers or less. Since such a shape memory alloy layer is easy to corrode, even if it can be successfully mass-produced, the resultant recording layer cannot be guaranteed to be stable.

SUMMARY OF THE INVENTION

It is therefore an object of the present invention to provide a new and improved rewritable, i.e., reversible optical recording medium which can effectively record/reproduce data, using a simple drive unit.

In accordance with the above object, the present invention is addressed to a specific optical recording medium which rewritably stores data on a recording layer formed on a substrate. The substrate is at least partially formed of an organic material, and releases gas components when it is irradiated with a first light beam having a given wavelength, i.e., is heated at a radiation region of a data recording light beam. The recording layer is deposited on the substrate by sputtering or vacuum vapor deposition, and is made of a specific amorphous material containing silicon and fine metal particles. When the gas components are released from the substrate, the recording layer is deformed to be locally peeled from the substrate by the pressure of the gas components, thereby forming a protuberance.

When the recording layer is irradiated with a second light beam having substantially the same wavelength as that of the first light beam and an intensity different therefrom, i.e., a data erasing light beam, the recording layer is deformed to remove the protuberance and to have a substantially flat surface, thereby erasing stored information.

The invention, its objects, and advantages will become more apparent from the detailed description of preferred embodiments presented below.

BRIEF DESCRIPTION OF THE DRAWINGS

In the detailed description of a preferred embodiment of the invention presented below, reference is made to the accompanying drawings of which:

FIG. 1 is a diagram (not drawn to scale) schematically showing a sectional structure of a principal part of a reversible bubble mode optical disc according to an embodiment of the present invention;

FIG. 2 is a diagram (not drawn to scale) showing a sectional structure of an optical disc of the present invention when information is recorded or written thereon, in which a recording layer is thermally deformed to form a protuberance;

FIG. 3 is a diagram (not drawn to scale) showing a sectional structure of the optical disc of the present invention after information recorded thereon is erased, wherein the recording layer is again thermally deformed, so as to be flattened;

FIG. 6 is a diagram schematically showing a principal arrangement of a co-magnetron sputtering apparatus preferably used in the manufacture of a reversible optical disc of the present invention;

FIGS. 7 to 12 are graphs respectively showing measurement results of various basic characteristics of samples of the reversible optical disc of the present invention; and FIG. 13 is a diagram schematically showing a principal arrangement of a vacuum deposition apparatus preferably used in the manufacture of a reversible optical disc of the present invention.

DETAILED DESCRIPTION OF PREFERRED EMBODIMENTS

Figure 4:
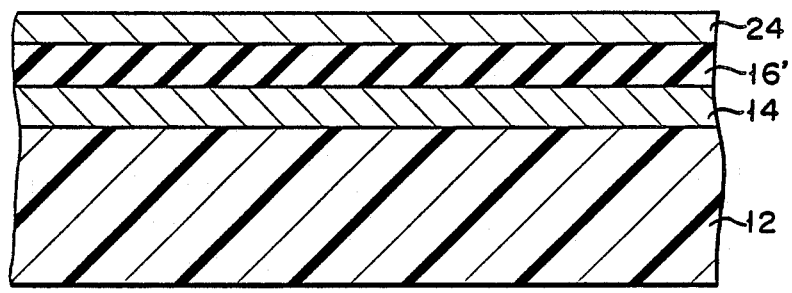
FIGS. 4 and 5 are diagrams (not drawn to scale) schematically showing sectional structures of main parts of reversible bubble mode optical discs according to other embodiments of the present invention.

Referring now to FIG. 1, data-writable or reversible optical recording disc 10 has disc-shaped transparent organic substrate 12 which releases gas components upon heating. Substrate 12 may be a polycarbonate or polyolefin substrate. When optical disc 10 is subjected to data write access, substrate 12 releases gas components such as an organic gas and/or steam. Recording layer 14 and protection layer 16 are sequentially stacked on substrate 12. Recording layer 14 is deformed (projects) and locally peeled from substrate 12 by the gas pressure of the gas components released from substrate 12, as shown in FIG. 2, thus forming bulge or protuberance 18 on a laser radiation region.

Recording layer 14 contains silicon and fine metal particles. More specifically, recording layer 14 must satisfy the following requirements:

(1) layer 14 must satisfactorily absorb an incident light beam;

(2) layer 14 must have an appropriate bonding strength with the substrate; be chemically stable (not easily (3) layer 14 must melted or evaporated) and have appropriate ductility;

(4) the crystal structure change of layer 14 must not be irreversible.

In order to satisfy requirement (1), recording layer 14 contains fine metal particles. The fine metal particles are uniformly dispersed in recording layer 14. The fine metal particles thermally absorb a data writing laser beam incident on recording layer 14. Highly conductive metal particles such as Gold (Au), Titanium (Ti), Cobalt (Co), Copper (Cu), Tungsten (W), Tin (Sn), and the like are used as the fine metal particles. Au fine particles are most preferable. As for requirement (2), the bonding strength between substrate 12 and recording layer 14 must be low enough to locally peel off recording layer 14 from substrate 12 at a laser beam radiation region by a gas pressure released from the substrate and to form protuberance 18 (see FIG. 2) having an optimal height (to provide an optimal recording sensitivity), and yet must be high enough to prevent layer 14 from being entirely peeled from the substrate over a long term of use. For requirement (3), recording layer 14 preferably has ductility so as not to be broken by a gas pressure released upon data recording. In order to satisfy requirements (3) and (4), recording layer 14 is formed of an amorphous silicon layer.

Recording layer 14 is further required to have birefringence n* falling within a properly controlled range. This requirement is necessary for improving a read sensitivity so that an amount of reflected read laser beam largely varies between a protuberance portion (i.e., recording portion) and a flat surface portion therearound (i.e., a nonrecording portion or an erased portion) when stored data information is to be reproduced (read out). For this purpose, a reflectance of an interface region between recording layer 14 and substrate 12 in a nonrecording or erased state must be different from that of an interface region between an inner surface of recording layer 14 and a hollow space in the protuberance formed such that recording layer 14 is locally peeled from substrate 12 by data recording. Therefore, if birefringence n* of recording layer is expressed by the following equation:

$$n^* = n - ik \tag{1}$$

where "i" is an imaginary number, and "n" and "k" are constants of real numbers, constants "n" and "k" are selected to satisfy the following relation:

$$n^2 + k^2 > ns \tag{2}$$

where ns: reflectance at a surface portion of substrate 12. Since reflectance ns of transparent resin substrate 12 is normally about 1.5, constants "n" and "k" of birefringence n* of recording layer 14 preferably fall within the following ranges:

$$0.5 \leq n \leq 1.5,\ 1 \leq k \leq 2.5 \tag{3}$$

Recording layer 14 of optical disc 10 shown in FIG. 1 is a thin film containing Au fine metal particles, silicon, and oxygen atoms (chemically bonded to silicon in recording layer 14). A silicon content is 10 to 80 atomic-percent, while an oxygen content is 5 to 60 atomic-percent. Since recording layer 14 additionally contains oxygen, temperature stability of data recording in recording layer 14 can be improved. In this case, even if ambient temperature is increased to about 400° C., recording layer 14 has a stable film quality, and can satisfactorily perform data read/reproduce/rewrite access.

Protection layer 16 serves to prevent corrosion of recording layer 14 in an ambient atmosphere and to control a shape of the protuberance of recording layer 14. As illustrated in FIG. 2, upon deformation of recording layer 14, protection layer 16 is also deformed. In this case, protection layer 16 controls the shape of protuberance 18 of recording layer 14 so as to prevent that recording layer 14 is excessively deformed and protuberance 18 cannot be removed in a data erase mode. When protuberance 18 is formed, hollow space 20 is present between deformed recording layer 14 and the top surface of substrate 12, as shown in FIG. 2. Therefore, it can be said that protuberance 18 is mainly caused by a residual stress generated when recording layer 14 is deformed. More specifically, it can be considered that an elastic stress of protection layer 16, a residual stress of recording layer 14, and a pressure of a residual gas in hollow space 20 are balanced. In a data erase mode, when an erasing laser beam is radiated on protuberance 18, recording layer 14 is substantially flattened by a stress relaxation of recording layer 14, as shown in FIG. 3. At this time, protection layer 16 serves to help releasing of gas components and relaxation of an accumulated stress of recording layer 14 (and protection layer 16 itself). Therefore, protection layer 16 is preferably added to optical disc 10 since a margin for forming and removing protuberance 18 (i.e., data recording power and data erasing power) can be widened.

When the data writing laser beam and the data erasing laser beam are radiated onto optical disc 10 from a data recording surface side (i.e., a protuberance formation side), protection layer 16 should be required to be transparent, since these laser beams must be transmitted through protection layer 16. In this case, layer 16 is preferably made of a laser insensitive thin film which does not absorb (or least absorbs) energy of the laser beams. From this point of view, protection layer 16 is preferably made of a transparent dielectric thin-film. On the other hand, when these laser beams are radiated from an opposite surface side of optical disc 10 (i.e., from a surface which is illustrated as a bottom surface in FIG. 1, and on which no layers are formed), protection layer 16 need not be transparent. In this case, protection layer 16 may be a thin film layer, such as an aluminum thin film, a metal film, etc., having a high reflectance enough to effectively reflect laser beam components transmitted through substrate 12 and recording layer 14 and to feed back the energy of the laser beams.

It should be noted that when the protection layer is a transparent dielectric thin-film, another layer serving as a light reflection layer may be provided on the transparent dielectric protection layer. FIG. 4 shows a multilayered structure of the recording medium in this case. The transparent dielectric protection C layer is designated by reference numeral 16' in FIG. 4. An aluminum layer is disposed as light reflection layer 24 on protection layer 16'. Recording layer 14 is an amorphous silicon layer which has a thickness of 60 nanometers and has an Si content (=Si/(Au+Si)) of 60 atomic-percent (at %), and in which Au particles are uniformly dispersed. Protection layer 16' is a silicon nitride film having a thickness ranging from 30 to 200 nanometers (e.g., a thickness of 60 nanometers). In this case, the thickness of Al reflection layer 24 is set to be about 40 nanometers. If the thickness of protection layer 16' is increased by several micrometers, underlying recording layer 14 is difficult to deform and a decrease in recording sensitivity is undesirably caused.

Figure 5:
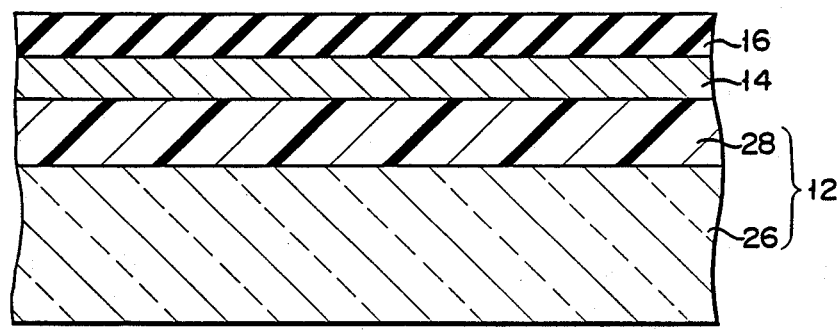

It should be also noted that substrate 12 of optical disc 10 need not be entirely formed of an organic material but can be at least partially made of an organic material at a top surface contacting recording layer 14. FIG. 5 shows this embodiment. According to a reversible optical disc presented in FIG. 5, substrate 12 has a double-layered structure having transparent inorganic film (such as glass layer) 26, and organic layer (such as polycarbonate thin film, polyolefin thin film, rhodinic acid ester thin film, or the like) 28 for releasing gas components of an organic gas and/or water vapor. For example, if the thickness of the glass layer is 1.5 millimeters, organic layer 28 preferably has a thickness of 100 nanometers.

According to the optical recording medium of the present invention having the above structure, when a data write laser beam is incident from a bottom surface side or top surface side of substrate 12 on which recording layer 14 is formed, gas components (organic gas and/or steam) are released from at least the top surface portion of substrate 12 by local heating of the laser beam. At the same time, the state of the top surface of substrate 12 is changed by the beam heating, and thus, a bonding strength between recording layer 14 and substrate 12 is decreased. As a result, recording layer 14 is locally peeled from substrate 12 at the laser beam radiation region and projects, as shown in FIG. 2, thus forming protuberance 18. Since gas components released from substrate 12 locally push up recording layer 14 by pressure, recording layer 14 is deformed to form protuberance 18. Some of gas components released from substrate 12 are absorbed by the substrate (the top surface portion of substrate 12 or organic layer 28 shown in FIG. 5), and remaining gas components are held in hollow space 20 (see FIG. 2) as residual gas. With this mechanism, a relatively tall protuberance which is well shape-controlled can be formed, and hence, data recording can be effectively performed.

Since the internal stress in the deformed portion of recording layer 14 is released by the thermal effect, optical disc 10 is irradiated with an erase laser beam (which has substantially the same wavelength as that of the write laser beam and a lower power than that of the write laser beam and is radiated on recording layer 14 for a longer period of time than a radiation time of the write laser beam), thereby flattening recording layer 14 and causing protuberance 18 to disappear. When a low-power laser beam is radiated onto a relatively wide area of recording layer 14 including protuberance 18, residual gas components left in protuberance 18 are heated (a temperature at this time is lower than the heating temperature in a data write mode). At this time, residual gas components are externally released and/or an internal stress of recording layer 14 is removed, so that recording layer 14 is recovered to flat state (initial surface condition) 22, as shown in FIG. 3. In this state, if a laser beam for writing another data is radiated, data can be again recorded or stored. The data erase beam need not have a different wavelength from that of the write laser beam, and can have only different radiation power and time to effectively perform a data erase operation. Therefore, write and erase beams can be obtained by a single laser beam generation device (such as a semiconductor laser). In this case, a single laser output can be controlled by an appropriate electrical circuit. This also contributes to simplify the arrangement of a drive unit.

When stored information is reproduced or read out, a reproduction laser beam is used. The power of the reproduction laser beam is set to be lower than a power at which the data-storing protuberance is caused to disappear, and to be high enough to allow focusing control with a sufficient amount of light reflected by the recording layer and to provide a high signal-to-noise ratio. When the laser beam is radiated onto recording layer 14, data-storing protuberance 18 of recording layer 14 and a flat surface portion therearound (nonrecorded area or an area from which the protuberance has already disappeared) have different amounts of reflected laser beams. A difference in amounts of reflected light can be detected using a known technique, so that stored information can be reproduced. Since a protuberance is well shape-controlled and is formed to have a relatively large height, a reproduction contrast can be improved, and hence, data reproduction can be effectively performed. In addition, since the optical disc of the present invention does not require a complicated optical system and a magnetic field apply means necessary for recording/reproducing data using a magneto-optical recording medium, an arrangement of a drive unit for the recording medium of the present invention can be simplified.

Recording layer 14 of a reversible bubble mode optical recording medium of the present invention may be easily and satisfactorily formed by single sputtering in an inert gas (such as Ar gas) atmosphere using a target of a metal material (e.g., Au) constituting fine metal particles contained in recording layer 14 and a silicon Si target constituting recording layer 14. In this case, if a sputtering gas contains an oxygen gas or the Si target is replaced with a silicon oxide (SiO or $SiO_2$ target), oxygen atoms can be effectively contained in sputtered recording layer 14. Alternatively, recording layer 14 may be formed such that Au and SiO targets are simultaneously subjected to vapor deposition.

When any one of the above manufacturing methods is employed, a resultant recording layer has a structure wherein Au fine metal particles are uniformly dispersed and oxygen atoms are additionally contained in an amorphous silicon layer. The amorphous silicon layer containing Au particles and oxygen atoms effectively serves as a reversible recording layer, and has good weather resistance since oxygen atoms are contained therein. Since the recording layer has a high bonding strength with organic substrate 12 or organic layer 28 deposited on glass layer 26, an optical disc having a long life time can be provided. Since the recording layer has neither toxicity nor unpleasant odor, it is safe for a human body.

When Au and Si targets are simultaneously subjected to sputtering in an Ar gas atmosphere so as to deposit a recording layer on a substrate, the interior of a sputtering apparatus is evacuated for a sufficiently long period of time (e.g., 20 hours or more) to increase an ultimate vacuum pressure to $10^{-6}$ Torr or lower, and thereafter, sputtering is performed, thereby forming an Au-Si alloy amorphous thin-film layer containing almost no oxygen atoms. This thin-film layer can also serve as a reversible recording layer. However, since the layer is crystallized at a temperature of about 200° C. or more, its film properties are undesirably changed upon data recording/reproduction. In contrast to this, when Au and Si targets are simultaneously subjected to sputtering in the Ar gas atmosphere, if an evacuation time of the interior of the sputtering apparatus is shortened (e.g., 10 minutes) and an ultimate vacuum pressure inside the apparatus is set to be low, e.g., about $10^{-4}$ Torr to perform sputtering, the resultant recording layer can have an appropriate oxygen content (5 to 60 atomic-percent). This is because oxygen atoms are properly left in the sputtering gas atmosphere. As a result, a recording layer structure wherein 10 to 80 atomic-percent of Au particles are uniformly dispersed in amorphous silicon containing 5 to 60 atomic-percent (at %) of oxygen atoms can be obtained. Alternatively, when 0.5 to 50 percent by volume of oxygen atoms are mixed in the sputtering gas atmosphere or the Si target is replaced with an SiO or $SiO_2$ target, a similar recording layer structure can be obtained. The present inventors demonstrated that the recording layer manufactured as described above were stable at high temperatures up to 400° C. The reversible recording layer having a proper oxygen content can be easily and effectively manufactured by using any one of the above-mentioned film formation methods.

Some examples of reversible optical discs actually manufactured by the present inventors will be exemplified hereinafter. According to the optical discs of these examples, an amorphous silicon thin film containing Au particles, 10 to 80 atomic-percent of silicon, and 5 to 60 atomic-percent of oxygen is used as a reversible recording layer.

TEST EXAMPLE 1

Some reversible optical recording discs were manufactured using an RF co-magnetron-sputtering apparatus schematically shown in FIG. 6. According to the sputtering apparatus shown in FIG. 6, vacuum vessel 50 in which a hermetical sputtering chamber is defined is arranged. The interior of vacuum vessel 50 is coupled to exhaust section 52 including a rotary pump and a cryopump (neither are shown) through evacuation port 54. Exhaust valve 56 is provided to evacuation port 54. Gas inlet port 58 having air intake valve 60 is provided to vacuum vessel 50. A necessary sputtering gas is introduced into vessel 50 through gas inlet port 58. When valves 56 and 60 are closed, the interior of vessel 50 can be perfectly hermetically sealed, thus defining a sputtering chamber.

Rotatable substrate supporting holder 62 is provided on the upper portion of vessel 50. During film formation, holder 62 is driven to rotate at a speed of about 60 rpm. Substrate 64 corresponding to substrate 12 is stably mounted on holder 62. Substrate 64 may be a substrate made of glass, quartz, polymethylmechacrylate, polycarbonate, polyolefin or the like. Target support plates 64 and 66 are arranged at the lower portion inside vessel 50 to oppose holder 62. Plate 64 supports first target 68 containing silicon. Plate 66 supports second target 70 including a metal constituting fine metal particles, e.g., Au, to be contained in recording layer 14. Target support plates 64 and 66 are electrically connected to RF power supply 72, and receive high-frequency power therefrom during sputtering. Vessel 50 has a magnet (or permanent magnet) (not shown). The magnet forms in orthogonal magnetic field having a predetermined intensity on the surfaces of the targets, and serves to provide a planar magnetron gun for performing magnetron sputtering.

Any one of 5" Si, SiO, and $SiO_2$ targets is used as first target 68. Second target 70 is an Au target. As a sputtering gas, pure Ar gas or Ar gas containing 0.5 to 50 percent (%) by volume of oxygen is used. When the SiO or $SiO_2$ target is used as first target 68, pure Ar gas is introduced into vacuum bath 50 through gas inlet port 58. When the Si target is used as first target 68, Ar gas containing oxygen is introduced into vessel 50. More specifically, oxygen atoms to be contained in the resultant recording layer are supplied from at least one of the sputtering gas and the solid-state target. Note that a flow rate of the sputtering gas into vessel 50 was set to be 30 to 70 SCCM. An ultimate vacuum pressure inside vessel 50 was set to be 5 m Torr.

Au-Si-based sputter films were formed using some different processes in accordance with the above-mentioned principles of the film formation method, and an as-deposited state, and a crystal structure or tissue were examined using a transmission type electron microscope. In addition, a temperature dependency of a change in reflective index was also examined.

For another sample on which a protection layer is additionally deposited, a record/reproduction/erase test was conducted by laser beam radiation. As the protection layer, a silicon nitride film was formed by the same film formation apparatus as that for the recording layer. An $Si_3N_4$ sintered body was used as a target, and Ar gas mixed with 10% of nitrogen was used as a sputtering gas. As a laser source, an He-Ne laser having a wavelength of 633 (nm) was used. The laser beam which was to have a spot size of 1 micrometer was radiated the substrate side onto the recording layer, and scanned at a linear speed of 0.6 m/sec using a mirror. A reproduction power was set to be a 0.4 milliwatts (mW) on the film surface. As laser pulse was set to have a power of 3 to 10 mW, and a pulse width of 300 nanoseconds (nsec) to 20 microseconds ($\mu$sec). Data was erased by linearly sweeping a laser beam having a power of 0.5 to 3 mW. As a result of the record/reproduction/erase test, when a glass or quartz substrate was employed, data could be rewritten. However, when an organic resin such as a polymethacrylate, polycarbonate, polyolefin substrate, or the like, was employed, data be rewritten. In other substrates, when a bonding strength of the recording layer to the corresponding substrate was very high, data could not be rewritten. Record/reproduction/erase characteristics presented below are those when a polymethacrylate substrate was used.

Table 1 summarizes the as-deposited state and observation results after annealing obtained with a transmission type electron microscope for typical Au-Si sputter films prepared by various processes.

TABLE 1

| Sample Name | ASL | ASR | ASO | Au—SiO | Au—SiO$_2$ |
|---|---|---|---|---|---|
| Target | Au, Si | Au, Si | Au, Si | Au, SiO | Au, SiO$_2$ |
| Gas | Ar | Ar | Ar + 10% −O$_2$ | Ar | Ar |
| As-depo. | Amorphous | f.c.c. (Au) + halo | f.c.c. (Au) + halo | f.c.c. (Au) + halo | f.c.c. (Au) + halo |
| After Annealing for 10 min at 100° C. | Amorphous | f.c.c. (Au) + halo | f.c.c. (Au) + halo | f.c.c. (Au) + halo | f.c.c. (Au) + halo |
| After Annealing for 10 min at 200° C. | Au + Si | f.c.c. (Au) + halo | f.c.c. (Au) + halo | f.c.c. (Au) + halo | f.c.c. (Au) + halo |
| After Annealing for 10 min at 400° C. | Au + Si | f.c.c. (Au) + halo | f.c.c. (Au) + halo | f.c.c. (Au) + halo | f.c.c. (Au) + halo |
| After Annealing for 10 min at 600° C. | Au Large Crystal + Si | f.c.c. (Au) Large Particle Size + halo + x | f.c.c. (Au) Large Particle Size + halo + x | f.c.c. (Au) Large Particle Size + halo + x | f.c.c. (Au) Large Particle Size + halo + x |

A sample for which an exhaust time (i.e., an ultimate vacuum pressure) from an atmospheric pressure before formation of a recording layer was changed was prepared, and its spectral reflectance and transmittivity characteristics, and rewrite characteristics were examined. In a sample (sample name: ASR) formed such that a sputtering gas was introduced while an exhaust time from an atmospheric pressure was about 10 minutes, and an ultimate vacuum pressure was not so high vacuum pressure, i.e., about $10^{-4}$ Torr, good rewrite characteristics were obtained. This optical disc was also suitable for mass production. In a sample (sample name: ASO) which was prepared such that 0.5 to 50% of oxygen were mixed with a sputtering gas, good rewrite characteristics were also obtained. When an oxygen partial pressure in the sputtering gas exceeded 50%, a film deposition rate was decreased, and this could not be used in a practical application. When Au and SiO sputter targets (sample name: Au-SiO) or Au and SiO$_2$ sputter targets (sample name: Au-SiO$_2$) were used, good rewrite characteristics were obtained. It was found from the analysis of these samples with good rewrite characteristics that they contained 5 to 60 atomic-percent (at %) of oxygen. Then, the samples with good rewrite characteristics were observed using a transmission type electron microscope. As a result, it was found that a halo inherent to an amorphous material and a diffraction ring of f.c.c. (Au) overlapped in an electron beam diffraction pattern, and each sample had a structure wherein Au particles (particle size: 100 nanometers or less) were dispersed in an amorphous of Si containing oxygen.

These samples were annealed and were similarly observed using a transmission type electron microscope. Even if the samples were annealed at 400° C., their tissues and diffraction patterns were not changed at all. When the samples were annealed at 600° C., the particle size of Au particles tended to increase and precipitation of new phase x (e.g., SiO) was observed. Meanwhile, these samples were deposited on a quartz substrate and changes in reflectance (wavelength 633 nm) upon change in temperature ranging from 250° to 500° C. at the temperature ramping of 20° C./min. were measured. The reflectance was not changed, and each film remained flat. It was found from the above tests, the structure inside the film or the birefringence of the recording layer according to the present invention were not changed up to 400° C.

After the sputtering chamber was evacuated for a long period of time (e.g., 20 hours) before formation of a recording layer to obtain an ultimate vacuum pressure of $10^{-6}$ Torr or more, Au and Si targets were sputtered in Ar gas atmosphere to form a sample having an oxygen content of 5 at % (sample name: ASL). Although a recording sensitivity was improved as a light absorption factor was increased, a margin of a rewritable recording power was narrowed. This film was in an as-deposited state and was amorphous. When this film was annealed at a temperature of 200° C., it was crystallized to be crystalline Au+crystalline Si. A change in reflectance upon change in temperature was measured. As a result, a reflectance was decreased as the film was crystallized. Furthermore the resistivity of this film was measured to be low, i.e., 4 to $9 \times 10^{-4}$ $\Omega$.cm. In contrast to this, the resistivity of the films having good rewrite characteristics described above was typically high, i.e., 0.2 $\Omega$.cm or more, and that of the same having a high Au content was also high, i.e., $2 \times 10^{-3}$ $\Omega$.cm.

For the above samples, atomic ratios of silicon : oxygen in the films were calculated by Auger electron spectrum analysis. The calculated values were calibrated using thermal oxide SiO on an Si wafer as a standard sample. As a result, in sample ASL having inferior rewrite characteristics, silicon:oxygen=1:0.1. In samples containing oxygen (ASO, Au-SiO, Au-SiO$_2$), silicon:oxygen=1:1.5 to 1.8. Other samples were also analyzed. It was found from this analysis that the atomic ratio of silicon : oxygen in a film was preferably 1:0.25 to 2, and more preferably, 1:1 to 2.

An infrared absorption spectrum was examined for the above samples. As a result, in sample ASL with an amorphous alloy film, a noticeable absorption peak did not appear. In other samples containing oxygen in films (ASR, ASO, Au-SiO, Au-SiO$_2$), an absorption peak similar to an Si-O stretching vibration peak and an Si-Si stretching vibration peak inherent to amorphous silicon dioxide or amorphous silicon suboxide appeared, and respective bonds were revealed.

It was found that bond states of Si-O in the sample (ASO) which derived oxygen from a sputtering gas and the samples (Au-SiO, Au-SiO$_2$) which derived oxygen from a sputter target, were slightly different from each other. In view of rewrite characteristics, the latter (Au-SiO, Au-SiO$_2$) is preferable. The former often requires initialization (performed in the same manner as in an erase mode) before recording.

TEST EXAMPLE 2

In sample ASR shown in Table 1, a composition ratio of Au:Si was changed by changing a power applied to corresponding targets, and recording layer composition dependency of rewrite characteristics was examined.

In FIG. 7, power necessary for recording and a light absorption factor are plotted with respect to compositions of recording layers. The recording pulse width was 4 microseconds ($\mu$sec), and light was incident on the substrate surface side. In a sample, a 90-nm silicon nitride thin film was deposited as a protection layer on a 40-nm recording layer. An atomic ratio (at %) of Si with respect to (Au+Si) is plotted along the abscissa in accordance with chemical quantitative analysis of Au and Si. Any sample had a structure wherein Au crystalline fine particles were dispersed in amorphous Si containing oxygen. Data could be rewritten within a ratio Si/(Au+Si) range of 10 to 80 at %, and in particular, high sensitivity was obtained within the range of 20 to 60 at %. If data was recorded with power 1.5 to 3 times rewritable recording power, data could be retained as nonerasable data.

In FIG. 8, reflectances R and modulation factors M after 1 to 10 rewrite operations of the above samples are plotted with respect to a recording layer composition. Modulation factor M is defined by M=(Rw−Re)/(Rw+Re) where Re is a reflectance of a nonrecorded portion or an erased portion, and Rw is a reflectance of a recorded portion. Factor M serves as a reference for a level of a reproduction signal. As can be seen from FIG. 8, very high modulation factor M, i.e., 17 to 55% can be obtained. If an optical disc of the present invention is used in an existing recording/reproduction system, an optical recording medium preferably has a reflectance of 20% or more, and a modulation factor of 15% or more. In a double-layered structure wherein a 90-nm thick silicon nitride film was deposited as a protection layer on a 40-nm thick recording layer, the above requirements of the modulation factor and the reflectance were satisfied when Si/(Au+Si) fell within the range of 10 to 50 at %.

Note that when the reflectance is relatively low, e.g., Si/(Au+Si)=60 at %, if a structure wherein reflection layer 24 such as an Al film is deposited on protection layer 16 like in the embodiment shown in FIG. 4 is adopted, both the requirements can be satisfied.

Figure 9:
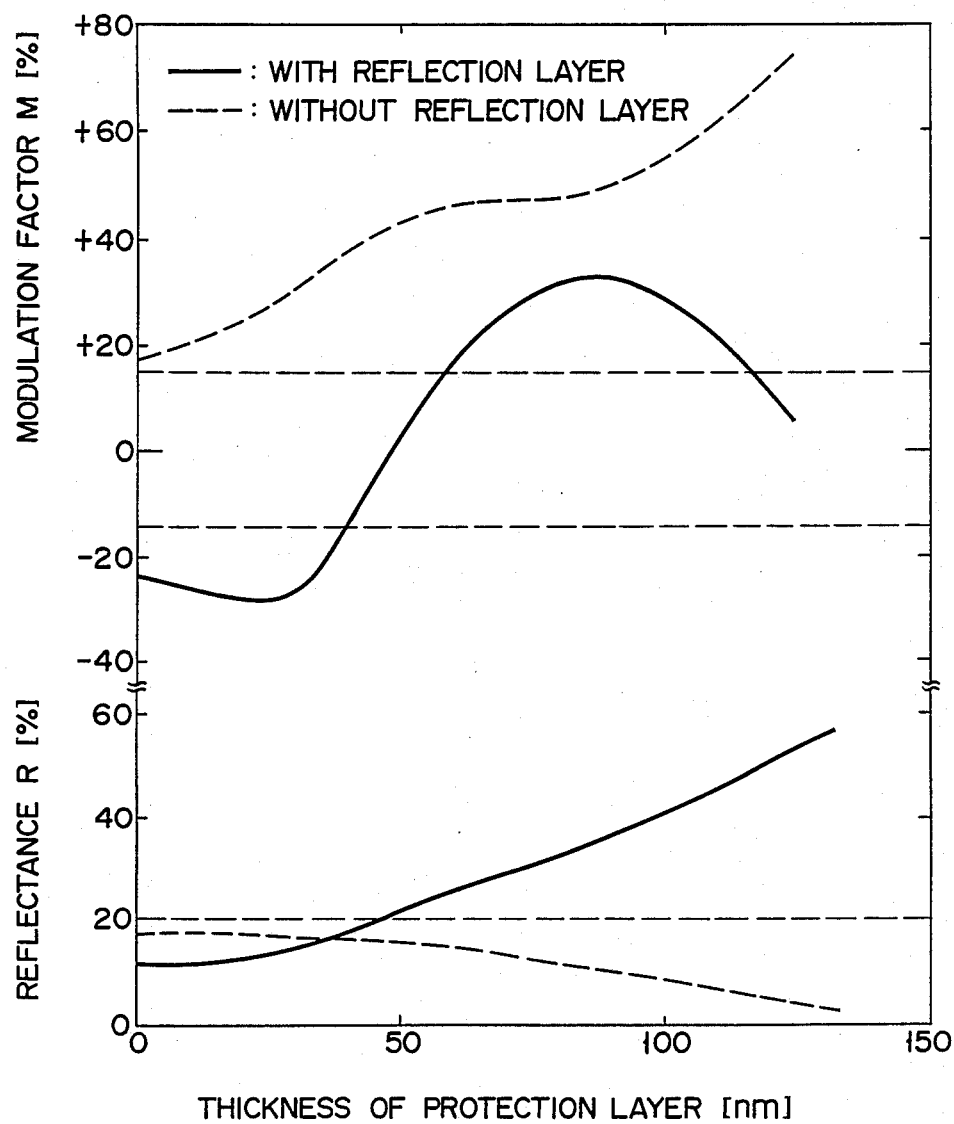

In an optical disc having the structure shown in FIG. 4, tests were conducted while a 60-nm thick thin film in which Si/(Au+Si)=60 at % was used as recording layer 14, various silicon nitride films were used as protection layer 16', and a 40-nm thick Al film was used as reflection layer 24. FIG. 9 shows protection layer film thickness dependency of reflectance R and modulation factor M of samples of this optical disc. FIG. 9 also shows a case wherein no reflection layer is formed for the sake of comparison. When this recording layer was used, the reflectance was less than 20% if no reflection layer was provided. However, when the reflection layer was formed, a reflectance of 20% or more, and a modulation factor of 15% or more could be obtained when the protection layer had a film thickness falling within the range of 60 nm to 110 nm. In an optical disc having the structure shown in FIG. 4, when the film thicknesses of the respective layers were adjusted, although the sign of modulation factor was inverted, i.e., a reflectance of the recorded portion was decreased, data could be similarly reproduced.

FIG. 10 shows test results of recording layer film thickness dependency in basic characteristics of an optical disc when recording layers having a silicon composition ratio of Si/(Au+Si)=33 at % and various thicknesses were used. A film thickness of the recording layer is plotted along the abscissa, and modulation factor M, reflectance R, light absorption factor A (=1−R−T), and power necessary for recording are plotted along the ordinate. As can be seen from the test results shown in FIG. 10, when the film thickness of the recording layer was increased, absorption factor A could be increased while maintaining modulation factor M and reflectance to be predetermined values, thus improving sensitivity. Taking an absorption factor into consideration, the film thickness of the recording layer preferably falls within the range of 20 to 200 nm.

FIG. 11 shows test results of recording layer film thickness dependency of reflectance R, transmittance T, and absorption factor A (=1−R−T). A sample in which a recording layer having a ratio of Si/(Au+Si)=33 at % was deposited on a quartz substrate was used. When the thickness of the recording layer is 20 nm or less, absorption factor A was decreased, and the recording sensitivity was also decreased. When the thickness of the recording layer exceeded 200 nm, absorption ratio A was saturated and was not increased. Rather, a thermal capacity and a thermal conduction factor were increased, thus degrading recording sensitivity.

In the above examples, a light beam is incident from the substrate surface side. If the light beam is incident from the film surface side, data can be similarly rewritten, and the same results are obtained. However, the light beam is preferably incident from the substrate surface side in view of a practical application because recording and erasing power can have a wider margin, and the light beam is not easily influenced by dust attached to the medium or cracks thereof.

In the record/reproduction/erase test examples described above, an He-Ne laser having a wavelength of 634 nm was used as a light beam source. Instead, when semiconductor lasers respectively having wavelengths of 780 nm, 800 nm, and 830 nm were used, the same good rewrite characteristics could be obtained.

TEST EXAMPLE 3

After recorded and erased portions (corresponding to "22" in FIG. 1) were formed using a laser beam on a recording layer containing oxygen formed on a polymethylmethacrylate substrate following the same procedures as in Test Example 1, the recording layer was peeled from the substrate, and the film quality of the recording layer was observed using a transmission type electron microscope. As a result, no changes of a structure wherein Au particles were dispersed in an as-deposited oxygen-containing Si amorphous, tissue, and a diffraction pattern were found in neither the recorded nor erased portion of the recording layer. It was thus revealed that the recording layer according to the present invention was different from one wherein an internal film structure or a birefringence was reversibly changed to rewrite data.

Similarly, the outer appearance of the recorded or erased portion on the polymethylmethacrylate substrate was observed using an optical microscope, a differential interference microscope, and a scan type electron microscope. As a result, it was found that the central portion of the recorded portion projected from the substrate, and the erased portion was recovered to be flat. The present inventors demonstrated that at least 100 rewrite operations could be performed using the record/erase mechanism of the present invention.

Both a portion with no thin film and a portion with a recording layer and a protection layer were formed on a single polymethylmethacrylate substrate, and a recording bit having a width of 1 μm and a length of 10 μm was formed to cross the boundary between both the portions. It was found that on the portion with the recording layer, the recorded portion projected in the same manner as in FIG. 2, and a rewrite operation could be performed. This reveals that the recording bit (projecting portion) is held not only by a gas pressure of gas layer 20 (see FIG. 2) but also by plastical deformation of recording layer 14.

TEST EXAMPLE 4

Only recording layers having thicknesses of 60 nm and 200 nm and a ratio of Si/(Au+Si)=59 at % were deposited on quartz substrates following the same procedures as in Test Example 1, and the resultant structures was left to stand at high temperature and high humidity. In this state, spectral reflectance and transmittance measurements, and optical microscope observation were performed at predetermined time intervals, and their service lives were evaluated. The temperature was 65° C. and the humidity was 95% RH. As an example of evaluation results, FIG. 12 shows a change over time in reflectance R and transmittance T of 60-nm thick samples at a wavelength of 633 nm. In any sample, no change was observed after lapse of 1,500 hours (about 2 months). More specifically, the recording layer according to the present invention has sufficiently high weather and corrosion resistances suitable for practical applications.

Compatibility between the recording layer and the organic resin substrate was then examined. The same recording layer as in Test Example 1 was deposited on each of a polycarbonate substrate and a polyolefin substrate, and a silicon nitride film was deposited thereon as a protection layer to prepare a sample. The resultant samples were left to stand at a temperature of 65° C. and 95% RH, and optical microscope observation was performed at predetermined time intervals. As a result, no change such as peeling or corrosion was observed after the lapse of 1,500 hours. Therefore, the recording medium of the present invention has good compatibility with the organic resin substrate, and has a long life even when the organic resin substrate is employed

TEST EXAMPLE 5

A reversible optical recording medium of the present invention can be formed not only by a sputtering method but also by a vapor deposition method. FIG. 13 schematically shows a vapor deposition apparatus used in practice in the tests conducted by the present inventors.

As shown in FIG. 13, vacuum vessel 100 in which a hermetical deposition chamber is defined is arranged. The interior of vessel 100 is coupled to exhaust section 102 including a rotary pump and an oil diffusion pump (neither are shown) through evacuation port 104. Evacuation valve 106 is arranged in evacuation port 104. When valve 106 is closed, the interior of vessel 100 is completely sealed, thus forming a vacuum deposition chamber.

Substrate supporting holder 108 is rotatably arranged on the upper portion of vacuum vessel 100. During film formation, holder 108 is driven to be constantly rotated. Substrate 110 corresponding to substrate 12 of an optical disc is stably mounted on holder 108. Substrate 110 may be a substrate made of glass, quartz, polymethylmethacrylate, polycarbonate, polyolefin, or the like. Electric heater 112 is arranged in a lower portion of bath 50 to be supported by heater supporting electrodes 114 and to face holder 110. Electrodes 114 are connected to known d.c. power source 116. Electron beam deposition apparatus 118 is arranged in the lower portion of vacuum vessel 100 together with heater 112. Apparatus 118 has a magnetic coil (not shown) and serves as an electron beam evaporation source. Shutter mechanism 120 is located between substrate supporting holder 108, and heater 112 and apparatus 118, as shown in FIG. 13.

After the interior of vessel 100 is evacuated and shutter mechanism 120 is opened, co-evaporation is performed by heater 112 and apparatus 118. At this time, heater 112 resistively heats a tantalum board (not shown) to evaporate SiO. At the same time, apparatus 118 generates ionized Au vapor. SiO and Au vapors were deposited on substrate 110 placed on holder 108, thereby obtaining an Au-SiO recording layer. A silicon nitride film was deposited as a protection layer on the recording layer following the same procedures as in Test Example 1. The record/reproduction/erase tests were conducted by the same method as in Test Example 1.

Table 2 summarizes typical samples and their rewrite characteristics.

TABLE 2

| Sample Name | Composition (molar ratio) Au:SiO | Thickness [nm] | Record/reproduction /erase characteristics |
|---|---|---|---|
| Au—SiO 1 | 95:5 | 60 | Unable to Erase |
| Au—SiO 2 | 82:18 | 74 | Data Rewritable |
| Au—SiO 3 | 76:24 | 79 | Data Rewritable |
| Au—SiO 4 | 67:33 | 74 | Data Rewritable |
| Au—SiO 5 | 57:43 | 74 | Data Rewritable |
| Au—SiO 6 | 41:59 | 65 | Unable to Erase |
| Au—SiO 7 | 21:79 | 55 | Unable to Record |

As can be seen from the above results, data was rewritable when the molar ratio of Au:SiO fell within the range of 85:15 to 50:50. In particular, high-sensitivity data write operation could be performed within the range of 70:30 to 50:50.

TEST EXAMPLE 6

The present inventors further prepared some reversible optical discs having the multi-layered structure shown in FIG. 5. A quartz layer and a polymethylmethacrylate layer were prepared as lower substrate layer 26 in FIG. 5. A rhodinic acid ester was applied onto the quartz layer and the polymethylmethacrylate layer to have a thickness of 100 nanometers (nm) by the spin-coat method, thus obtaining a double-layered structure. The rhodinic acid ester layers formed as described above served as gas releasing layer 28 shown in FIG. 5. A recording layer having a thickness of 50 nanometers and an Si content of 20 atomic-percents (i.e., Si/(Au+Si)=20 at %) and a protection layer of a 45-nanometer silicon nitride film were sequentially deposited on each rhodinic acid ester layer by the same formation method of samples shown in above presented Table 1, i.e., the co-magnetron sputtering method. At this time, as comparative examples, the same recording layer and protection layer are respectively deposited on lower substrates each formed of a quartz layer and a polymethylmethacrylate layer, thus preparing optical discs.

Data record/reproduction/erase tests by He-Ne laser radiation were conducted for the four samples obtained as described above. A pulse time width of the recording laser beam was 4 microseconds, and dependency of the rewrite characteristics of the above four optical discs with respect to the recording laser power was examined. As a result, according to the two optical discs having the rhodinic acid ester layers serving as gas releasing layers 28, when the recording power of the data write laser beam was 2 milliwatts (mW) or more, data recording could be satisfactorily performed. The protuberance formed in this manner could be effectively flattened upon radiation of the erasing laser beam. In contrast to this, according to the third optical disc having a quartz substrate and no rhodinic acid ester layer serving as gas releasing layer 28, even when the recording power of the data write laser beam was changed within the range of 0 to 8 milliwatts, effective data recording could not be performed. According to the fourth optical disc, effective data recording was impossible, and when the recording power exceeded 7 milliwatts, the formed protuberance could not be flattened even if the erasing laser beam was radiated thereon. This fact reveals that the fourth sample can serve as a reversible recording medium only when the recording power falls within a limited range of 4 to 7 milliwatts, and is not suitable for practical application at all. The above test data guarantees the effectiveness of the optical disc having the double-layered substrate structure of FIG. 5.

Although the invention has been described with reference to a specific embodiment, it shall be understood by those skilled in the art that numerous modifications may be made that are within the spirit and scope of the inventive contribution.

What is claimed is:

1. A data rewritable optical recording medium comprising:
   (a) a substrate at least partially formed of an organic material, and releasing a gas component when said substrate is heated at a radiation region of a first light beam; and
   (b) an amorphous recording layer which is formed on said substrate, contains silicon and fine metal particles, and is deformed to be locally peeled from said substrate upon releasing of the gas component so as to form a protuberance, said recording layer being deformed to cause said protuberance to disappear to have a substantially flat surface when a second light beam having an intensity different from that of the first light beam is radiated thereonto, and wherein said recording layer contains oxygen, which serves to increase an upper-limit temperature at which said recording layer can stably perform data recording.

2. The recording medium according to claim 1, wherein said recording layer contains 5 to 60 atomic-percent of oxygen.

3. The recording medium according to claim 2, wherein said recording layer contains 10 to 80 atomic-percent of silicon.

4. The recording medium according to claim 1, wherein the fine metal particles comprise a high conductivity metal thermally absorbing the first light beam, said high conductivity metal being selected from the group substantially consisting of gold, titanium, cobalt, copper, tungsten, and tin.

5. The recording medium according to claim 1, wherein said substrate comprises a single organic substrate.

6. The recording medium according to claim 1, wherein said substrate comprises a double layered structure having
   an inorganic layer, and
   an organic thin-film layer formed on said inorganic layer and releasing a gas component by being externally heated.

7. The recording medium according to claim 1, further comprising:
   (c) a protection layer formed on said recording layer to prevent oxidation of said recording layer, said protection layer being deformed together therewith when said recording layer is deformed to form a protuberance corresponding to said protuberance.

8. The recording medium according to claim 7, wherein said protection layer comprises a transparent dielectric thin-film layer.

9. The recording medium according to claim 8, wherein said transparent dielectric thin-film layer comprises a silicon nitride thin film.

10. A data rewritable optical recording medium comprising:
    (a) a substrate at least partially formed of an organic material, and releasing a gas component when said substrate is heated at a radiation region of a first light beam; and
    (b) an amorphous recording layer which is formed on said substrate, consisting essentially of silicon, fine metal particles and oxygen, and is deformed to be locally peeled from said substrate upon releasing of the gas coponent so as to form a protuberance, said recording layer being deformed to cause said protuberance to disappear to have a substantially flat surface when a second light beam having an intensity different from that of the first light beam is radiated thereonto, wherein said oxygen serves to increase an upper-limit temperature at which said recording layer can stably perform data recording.

11. The recording medium according to claim 10, wherein said recording layer contains 5 to 60 atomic-percent of oxygen.

12. The recording medium according to claim 11, wherein said recording layer contains 10 to 80 atomic-percent of silicon.

13. The recording medium according to claim 10, wherein the fine metal particles comprise a high conductivity metal thermally absorbing the first light beam, said high conductivity metal being selected from the group substantially consisting of gold, titanium, cobalt, copper, tungsten, and tin.

14. The recording medium according to claim 10, wherein said substrate comprises a single organic substrate.

15. The recording medium according to claim 10, wherein said sunstrate comprises a double layered structure having
an inorganic layer, and
an organic thin-film layer formed on said inorganic layer and releasing a gas component by being externally heated.

16. The recording medium according to claim 16, further comprising:
(c) a protection layer formed on said recording layer to prevent oxidation of said recording layer, said protection layer being deformed together therewith when said recording layer is deformed to form a protuberance corresponding to said protuberance.

17. The recording medium according to claim 16, wherein said protection layer comprises a transparent dielectric thin-film layer.

18. The recording medium according to claim 17, wherein said transparent dielectric thin-film layer comprises a silicon nitride thin film.

* * * * *